Dec. 17, 1940.  J. R. SKOVERSKI  2,225,135
LEADER CONSTRUCTION
Filed July 1, 1937
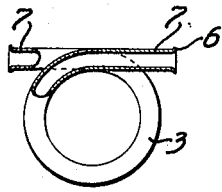
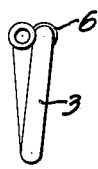
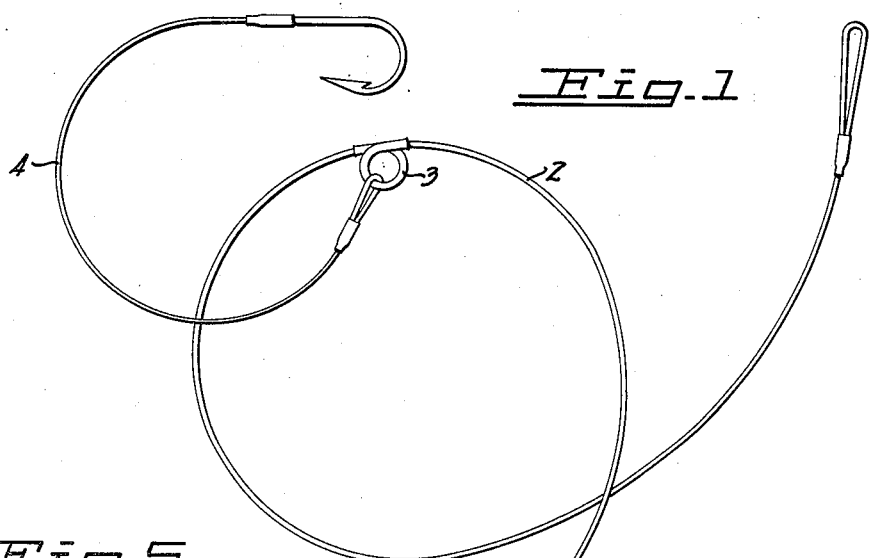
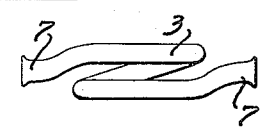
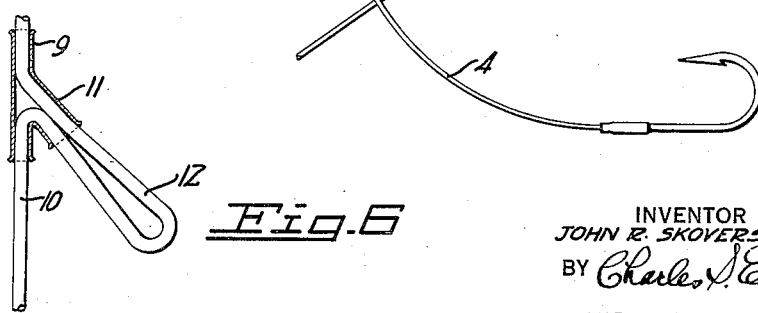
INVENTOR
JOHN R. SKOVERSKI
BY Charles S. Evans
HIS ATTORNEY Patented Dec. 17, 1940

2,225,135

UNITED STATES PATENT OFFICE 2,225,135

LEADER CONSTRUCTION

John R. Skoverski, Oakland, Calif., assignor to Joseph Schor, San Francisco, Calif.

Application July 1, 1937, Serial No. 151,388

3 Claims. (Cl. 43—28)

My invention relates to leaders used in fishing tackle; and more particularly to means for forming loops in such leaders.

The broad object of the invention is to provide a loop forming means which materially increases the strength of the leader by eliminating the knots usually employed to make loops in a leader.

Another object of the invention is to provide a loop holding means which may be applied quickly and easily, and which eliminates the tedious and time taking effort of making knotted loops.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

Figure 1 is an elevational view showing a leader with the loop holding means or eyelets embodying my invention.

Figure 2 is a side view, partly in section and partly in elevation, showing the eyelet; and Figure 3 is an end elevational view of the same.

Figure 4 is a similar view showing a modified construction in which the overlapping portions of the eyelet are separated.

Figure 5 is a top view of an eyelet showing another modification, in which the ends of the eyelet tube are axially aligned.

Figure 6 is a sectional view showing still another form of loop holding means embodying my invention.

In terms of broad inclusion, the improvements in fishing tackle of my invention comprise a leader having a loop formed therein, and holding means for the loop comprising a tube embracing the leader. The tube is preferably coiled to embrace the entire loop portion of the leader, and the ends of the tube preferably extend in opposite directions from the base of the loop to receive the main portions of the leader extending from the loop. The rim portions of the tube at the ends thereof are also preferably flared outwardly to prevent cutting the leader.

In greater detail, and referring to Figures 1 to 3 of the drawings, the preferred form of loop holding means or eyelet embodying my invention comprises a tube embracing an intermediate section of a leader 2 and coiled to provide a circular loop 3 forming an eye to which the snell 4 of a hook may be fastened. The tube may be of any suitable material, such as metal; and the rim portions 6 of the tube are preferably flared outwardly to prevent cutting the leader 2, which latter may be of any suitable material, such as gut.

The end portions of the tube convolution preferably overlap, so that the ends 7 of the tube extend tangently from the base of the loop and in opposite directions along the main portion of the leader. As best shown in Figure 3, the overlapping portions of the tube preferably lie tightly together, forming a closed loop. In this type of eyelet the snell 4 of a hook may be attached by a hitch 8, in the usual manner.

Instead of making a closed loop, the overlapping portions of the tube may be separated slightly as shown in Figure 4. This permits a snell to be threaded on the leader and engaged in the eyelet without forming a hitch. In order to prevent the coil from spreading apart under tension, the ends of the tube may be bent inwardly slightly adjacent the base of the loop to bring them into axial alignment. This arrangement is shown in Figure 5.

The eyelets above described are simple to make and are easy to apply to a leader. They also make a very neat and trim appearance. The principal advantage of course is that the structure provides means for forming loops in a leader without the use of knots. It is recognized that a knotted gut leader has about 60% less strength than the same gut without knots. In my improved structure the continuity of the gut strand is maintained, and the full strength of the unknotted gut is preserved. In my eyelet the gut follows the smooth curve of the coiled tube, without the sharp bends and breaks which are inherent in knots. As a matter of fact, the tube of my construction serves as a reinforcing and protective element, and strengthens rather than weakens the leader at the loop. Furthermore, the tube covers and protects the portion of the gut in the loop, where the snell of a hook is attached, and prevents the usual wearing of the gut at this point.

The preferred method of making the eyelet comprises threading a straight metal tube on the leader; the inside diameter of the tube being such as to make a snug sliding fit with the leader strand. When the tube is in proper position it is bent into its coil shape. This bending causes the tube to flatten slightly, just enough to bind tightly on the leader and secure the eyelet.

Another form of loop holding means embodying my invention is shown in Figure 6. Here a tube 9 is provided to embrace the portions of leader 10 at the base of a loop, as in my preferred construction. In this case however, the tube does not extend completely around the loop, but is provided with a neck 11 at one side through which portions of the leader extend in a loop 12. The loop in this modification is thus also formed as a continuous strand, without knots.

I claim:

1. In a fishing tackle, a leader having a loop formed in an intermediate section thereof with the main portions of the leader extending in opposite directions from the base of the loop, and holding means for the loop comprising a tube embracing the leader with the end portions of the tube extending in opposite directions at the base of the loop, said tube being fixed on the leader to prevent its shifting along the latter.

2. An eyelet for a leader comprising a tube for embracing the leader and coiled to provide a loop with the end portions of the convolution overlapping and the ends of the tube extending in opposite directions, said ends of the tube being bent inwardly adjacent the overlapping portions to bring the ends into axial alignment.

3. In a fishing tackle, a leader having a loop formed in an intermediate section thereof with the main portions of the leader extending in opposite directions from the base of the loop, and holding means for the loop comprising an eyelet engaging the leader portions in the loop, said eyelet being fixed on the leader to prevent its shifting along the latter.

JOHN R. SKOVERSKI.